US009787446B2

(12) United States Patent
Roth et al.

(10) Patent No.: US 9,787,446 B2
(45) Date of Patent: Oct. 10, 2017

(54) METHOD AND DEVICE FOR PROCESSING RESOURCE BLOCKS

(71) Applicant: Intel IP Corporation, Santa Clara, CA (US)

(72) Inventors: Kilian Roth, Munich (DE); Cecilia Carbonelli, Munich (DE); Stefan Fechtel, Zorneding (DE)

(73) Assignee: Intel IP Corporation, Santa Clara, CA (US)

( * ) Notice: Subject to any disclaimer, the term of this patent is extended or adjusted under 35 U.S.C. 154(b) by 162 days.

(21) Appl. No.: 14/660,029

(22) Filed: Mar. 17, 2015

(65) Prior Publication Data
US 2015/0270934 A1    Sep. 24, 2015

(30) Foreign Application Priority Data

Mar. 18, 2014   (DE) ................. 10 2014 103 702

(51) Int. Cl.
*H04L 5/00* (2006.01)

(52) U.S. Cl.
CPC .......... *H04L 5/0032* (2013.01); *H04L 5/0073* (2013.01); *H04L 5/0023* (2013.01); *H04L 5/0048* (2013.01); *H04L 5/0082* (2013.01)

(58) Field of Classification Search
CPC ........... H04J 11/0043; H04W 28/0236; H04W 72/082; H04L 5/0032; H04L 5/0073; H04L 45/46; H04L 1/1893; H04L 47/828; H04B 17/309; H04B 17/336; H04B 17/345

See application file for complete search history.

(56) References Cited

U.S. PATENT DOCUMENTS

| 2006/0285479 | A1* | 12/2006 | Han | H04B 7/0678 370/203 |
| 2008/0253286 | A1* | 10/2008 | Shriram | H04L 41/147 370/232 |
| 2010/0034092 | A1* | 2/2010 | Krishnamurthy | H04W 56/00 370/241 |
| 2011/0013556 | A1 | 1/2011 | Molnar et al. | |
| 2011/0199986 | A1* | 8/2011 | Fong | H04L 5/0035 370/329 |
| 2011/0222500 | A1* | 9/2011 | Takaoka | H04L 5/0041 370/329 |
| 2012/0021710 | A1 | 1/2012 | Tsukamoto et al. | |
| 2012/0115499 | A1* | 5/2012 | Lin | H04J 11/0023 455/452.2 |

(Continued)

OTHER PUBLICATIONS

Office Action dated Mar. 11, 2016 for Taiwan Patent Application No. 104105052 (with English translation).

*Primary Examiner* — Benjamin H Elliott, IV
(74) *Attorney, Agent, or Firm* — Schiff Hardin LLP

(57) ABSTRACT

A method (700) for processing resource blocks in a receiver may include receiving (701) a signal comprising transmissions from a plurality of radio cells, wherein received samples of the signal are arranged in a plurality of resource blocks (300); forming (702) a plurality of clusters ($\{x_{i,j}^N\}$) based on a similarity criterion with respect to the plurality of resource blocks (300); and assigning (703) each resource block of the plurality of resource blocks (300) to one cluster of the plurality of clusters ($\{x_{i,j}^N\}$).

19 Claims, 10 Drawing Sheets

(56) References Cited

U.S. PATENT DOCUMENTS

| | | | |
|---|---|---|---|
| 2012/0236731 A1* | 9/2012 | Beaudin | H04W 72/082 370/248 |
| 2013/0051345 A1* | 2/2013 | Ciochina | H04L 5/0091 370/329 |
| 2013/0195023 A1* | 8/2013 | Vaisanen | H04L 1/20 370/329 |
| 2013/0238954 A1* | 9/2013 | Jang | H04L 1/0061 714/758 |
| 2013/0308557 A1* | 11/2013 | Gao | H04W 72/0406 370/329 |
| 2014/0226586 A1* | 8/2014 | Kimura | H03M 13/2957 370/329 |
| 2015/0270934 A1* | 9/2015 | Roth | H04L 5/0032 370/330 |

* cited by examiner

METHOD AND DEVICE FOR PROCESSING RESOURCE BLOCKS

FIELD

The disclosure relates to methods and devices for processing resource blocks comprising transmissions from a plurality of radio cells in a receiver. In particular, the disclosure relates to blind SINR estimation and classification based on cluster analysis in the presence of selective interference. Aspects of the disclosure relate to systems that may include 4G cellular modems and LTE-A baseband receiver design in mobile networks.

BACKGROUND

Modern cellular networks face the challenge that the demand for data traffic is increasing dramatically. Network operators need to modify their networks to increase the overall capacity. In both homogenous and heterogeneous networks, the mobile operates in dynamic scenarios with multiple interfering cells. The interferers' configuration (scheduling, power) can change at each subframe and physical resource block (PRB). In other words, the User Equipment (UE) can experience both time and frequency selective interference and needs to quickly estimate the channel parameters and accordingly configure the receiver processing. It may thus be desirable to provide information on interferers' configuration for improving channel parameter estimation and configuration of receiver processing.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
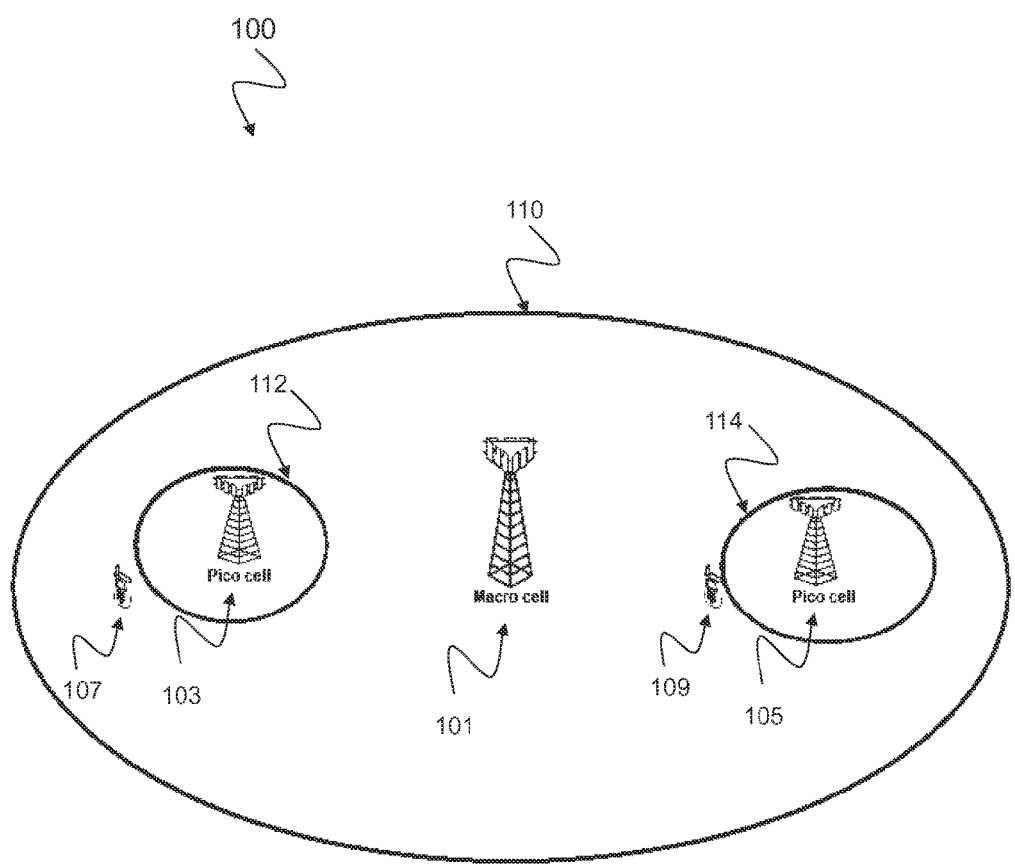
FIG. 1 is a schematic diagram of a heterogeneous network 100 including a macro cell 101 and pico cells 103, 105 according to an interference scenario.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
CRS: Cell specific Reference Signal,
RE: Resource Element,
PRB: Physical Resource Block,
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
SINR: signal-to-interference and noise ratio,
RB: resource block, e.g., a resource block in frequency direction times slot in time direction,
OFDM: Orthogonal Frequency Division Multiplex,
NodeB: base station,
IRC: Interference Rejection Combining,
ICIC: Inter-Cell Interference Coordination,
eICIC: enhanced Inter-Cell Interference Coordination, introduced in the context of LTE Release 10,
FeICIC: Further enhanced Inter-Cell Interference Coordination, introduced in the context of LTE Release 11,
MIMO: Multiple Input Multiple Output,
CE: Channel Estimator,
WF: Whitening Filter,
CSI-FB: Channel State Information Feed-Back,
EVA: Extended Vehicular A channel model according to 3GPP TS 36.104,
NAICS: Network-Assisted Interference Cancellation and Suppression.

The methods and devices described herein may be based on resource blocks, in particular resource blocks received from radio cells, and clusters. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in multi-layer heterogeneous networks. Multi-layer heterogeneous networks (HetNet) may be used in LTE and LTE-Advanced standards to buildup the network of not only a single type of eNodeB (homogeneous network), but to deploy eNodeBs with different capabilities, most importantly different Tx-power classes. These eNodeBs may commonly be referred to as macro eNodeBs or macro cells, pico eNodeBs or pico cells and femto/home eNodeBs or femto cells. Alternatively, the term "small cells" might be used as a broader term covering pico and femto cells. In addition to HetNets, the methods and devices described in this disclosure may also be applied to homogeneous networks, typically at cell edges, for example.

The methods and devices described hereinafter may be applied in blind parameter estimation for fast channel estimation in the presence of inter-cell interference. The following assumptions hold for such scenarios: The UE has no a priori knowledge on the interferers' scheduling, configuration and received power; and the UE has only basic information on its own configuration (bandwidth, cell ID). Blind estimates are often unreliable since they are based on very few samples and, given the dynamic interference scenarios, cannot benefit from conventional time and frequency filtering/averaging with fixed filter lengths. The methods and devices described hereinafter provide techniques that can refine these initial blind estimates while preserving the assumption on the minimal a priori knowledge on the transmit configuration for the serving and the aggressors' transmit signals.

The methods and devices described hereinafter may be applied in eICIC (enhanced Inter-Cell Interference Coordination) and FeICIC (Further enhanced Inter-Cell Interference Coordination) systems. ICIC (and FeICIC) based on Carrier Aggregation may enable an LTE-A UE to connect to several carriers simultaneously. It not only may allow resource allocation across carriers, it also may allow scheduler based fast switching between carriers without time consuming handover. The methods and devices described hereinafter may be applied in both eICIC systems as introduced in the context of LTE Release 10 and FeICIC systems as introduced in the context of LTE Release 11.

The methods and devices described hereinafter may be applied in interference aware receivers such as IRC (Interference Rejection Combining) receivers. IRC is a technique that may be used in an antenna diversity system to suppress co-channel interference by using the cross covariance between the noise in diversity channels. Interference rejection combining (IRC) may be used as an efficient alternative to increase uplink bit rates in areas where cells overlap. The interference rejection combining (IRC) receiver may be effective in improving the cell-edge user throughput because it may suppress inter-cell interference. The IRC receiver may be based on a minimum mean square error (MMSE) criterion, which may require channel estimation and covariance matrix estimation including the inter-cell interference with high accuracy.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

FIG. 1 is a schematic diagram of a heterogeneous network 100 including a macro cell 101 and pico cells 103, 105. The pico base stations 103, 105 may be characterized by substantially lower transmit power as compared to the macro base station 101. Due to the large disparity between the transmit power levels among two type of base stations, the coverage 112, 114 of the pico base station 103, 105 is significantly limited than the coverage 110 of the macro base station 101 as shown in FIG. 1. The larger coverage 110 of the macro cells 101 may attract more users 107, 109 towards high power macro eNodeB although there might not be enough resources to efficiently serve all user terminals. At the same time, the resources of smaller power base station may remain underutilized. The UEs 107, 109 may include methods for processing resource blocks including clustering as described in the following to gain information on the interference scenario of the heterogeneous network 100.

Figure 2:
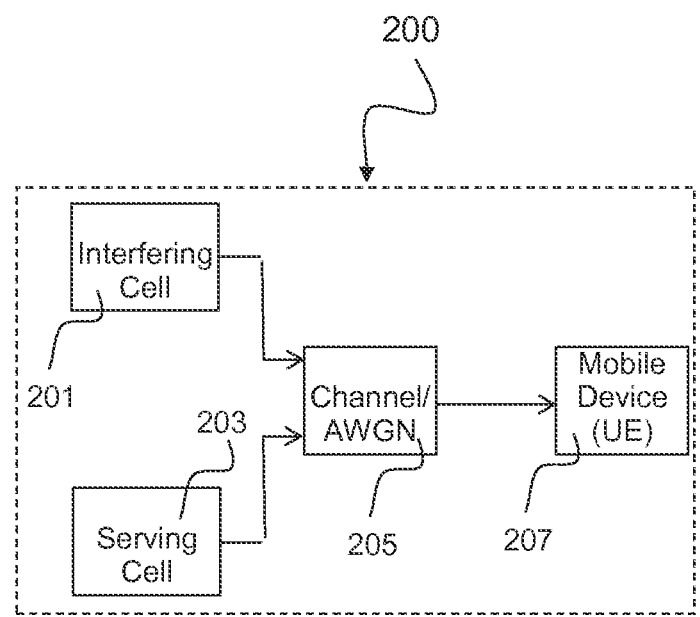
FIG. 2 is a schematic diagram of an interference scenario 200 including a mobile device 207 receiving a radio signal of a serving cell 203 which radio signal is interfered by a radio signal of an interfering cell 201 when transmitted over a communication channel 205.

FIG. 2 is a schematic diagram of an interference scenario in a communication system 200 including a mobile device 207 receiving a radio signal from which radio signal may be interfered by a radio signal of an interfering cell 201 when transmitted over a communication channel 205. Both, the radio signal of the serving cell 203 and the radio signal of the interfering cell 201 may be represented as a two-dimensional signal pattern in time-frequency domain as illustrated in FIG. 3, e.g. according to an LTE frame structure.

Both, the radio signal of the serving cell 203 and the radio signal of the interfering cell 201 may be transmitted over a communication channel 205. In the communication channel 205 both signals may be superimposed thereby forming a common signal as receive signal which may be received by the mobile device 207. The mobile device 207 may receive samples that are arranged in a plurality of resource blocks 300 as depicted in FIG. 3. A mobile device 207 applying a method for processing resource blocks or a device configured to process resource blocks as described in the following may be able to detect such interference scenarios and provide SINR maps for illustrating these scenarios.

Figure 3:
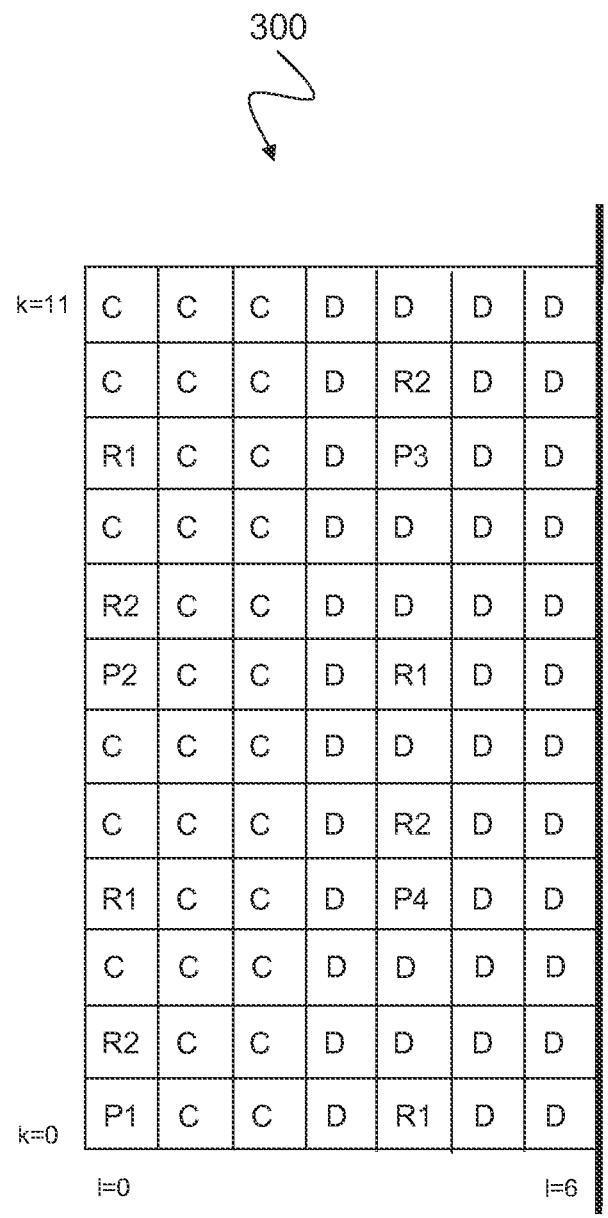
FIG. 3 is a schematic time-frequency representation of a resource block 300 that may be used in a processing circuit 400 as described below with respect to FIG. 4 or in the methods 700, 800 as described below with respect to FIGS. 7 and 8.

FIG. 3 is a schematic time-frequency representation of a resource block 300 that may be used in a processing circuit 400 as described below with respect to FIG. 4 or in the methods 700, 800 as described below with respect to FIGS. 7 and 8. The resource block 300 may include control and data symbols as well as pilot symbols and interfering reference symbols. The resource block 300 may be structured as a two-dimensional grid carrying multiple resource elements which are represented by small squares forming the grid. The resource elements may be partitioned in a control region comprising control resource elements C in the left section of the grid (from time samples l=0 to l=2) and in a data region comprising data resource elements D in the right section of the grid (from time samples l=3 to l=6). In another example not shown in FIG. 3, the control region may extend from l=0 to l=1 and the data region may extend from l=2 to l=6. Pilot symbols P1, P2, P3, P4 also called pilot resource elements or cell specific reference symbols of the serving cell, e.g. originating from the serving cell 203 as depicted in FIG. 2 may be distributed over the grid in a regular fashion. The mobile device 207 may use its knowledge about distribution of the pilot symbols to perform channel estimation. Reference symbols (e.g. cell specific reference signals) R1, R2 (also called pilot symbols) of other radio cells, i.e. interfering radio cells may be distributed over the grid in a similar regular fashion. These reference symbols of other radio cells, e.g. from radio cell 201 as depicted in FIG. 2 are interfering the data transmission between serving cell and mobile device.

Methods and devices as described in this disclosure provide a technique for illustrating interference scenarios, e.g. by using SINR maps. Such techniques apply for non-colliding interference scenarios as well as colliding interference scenarios. When the reference signals of the interfering cell 201 denoted hereinafter as R1, R2 do not coincide with the reference signals of the serving cell 203 denoted hereinafter as P1, P2, P3, P4 the interference scenario is denoted as "non-colliding". When the reference signals of the interfering cell 201 coincide with the reference signals of the serving cell 203 the interference scenario is denoted as "colliding".

In a frequency- and time-selective interference environment, for example in a mobile communications standard such as LTE, the UE needs to rapidly and correctly configure receiver functions such as channel estimator (CE), whitening filters (WF), and channel state information feedback (CSI-FB) generator so as to mitigate the effects of interference. To facilitate these functions, the UE may generate a 2-Dimensional (2D) map reflecting the distribution of the received signal to noise plus interference ratio (SINR) across time and frequency resources. This SINR map may be regarded as a coarse estimate of the interferers' scheduling and may be distributed to all receiver blocks that may require a so called 'classification' of the interferers' power across subframes and resource blocks such as physical resource blocks (PRBs) as defined in LTE standard.

The SINR may be initially estimated for every Resource Block (RB) in a blind manner. Due to the small number of available reference symbols (RS) per block, these estimates may be noisy. Methods and devices for processing resource blocks as described in this disclosure, e.g. with respect to FIGS. 4, 7 and 8, provide techniques for refining these initial estimates by means of an iterative procedure based on clustering. The latter can be regarded as a blind approach to time/frequency filtering of first raw SINR estimates.

Such techniques may be described by the following two processing blocks: In a first processing block, initial raw SINR estimates may be obtained and refined in a blind manner by applying clustering techniques, e.g. clustering techniques as applied in the area of image processing. In a second processing block, an accurate 2D SINR map with PRB granularity may be delivered, e.g. on a subframe basis, i.e. at each subframe, to all those receiver blocks requiring a preliminary interference classification for adequate interference mitigation and also to others.

These techniques as described in the following have very low complexity and, for this reason, may be applied on a subframe basis, for example once per subframe, as required in many dynamic interference scenarios according to mobile communication standards like LTE.

Figure 4:
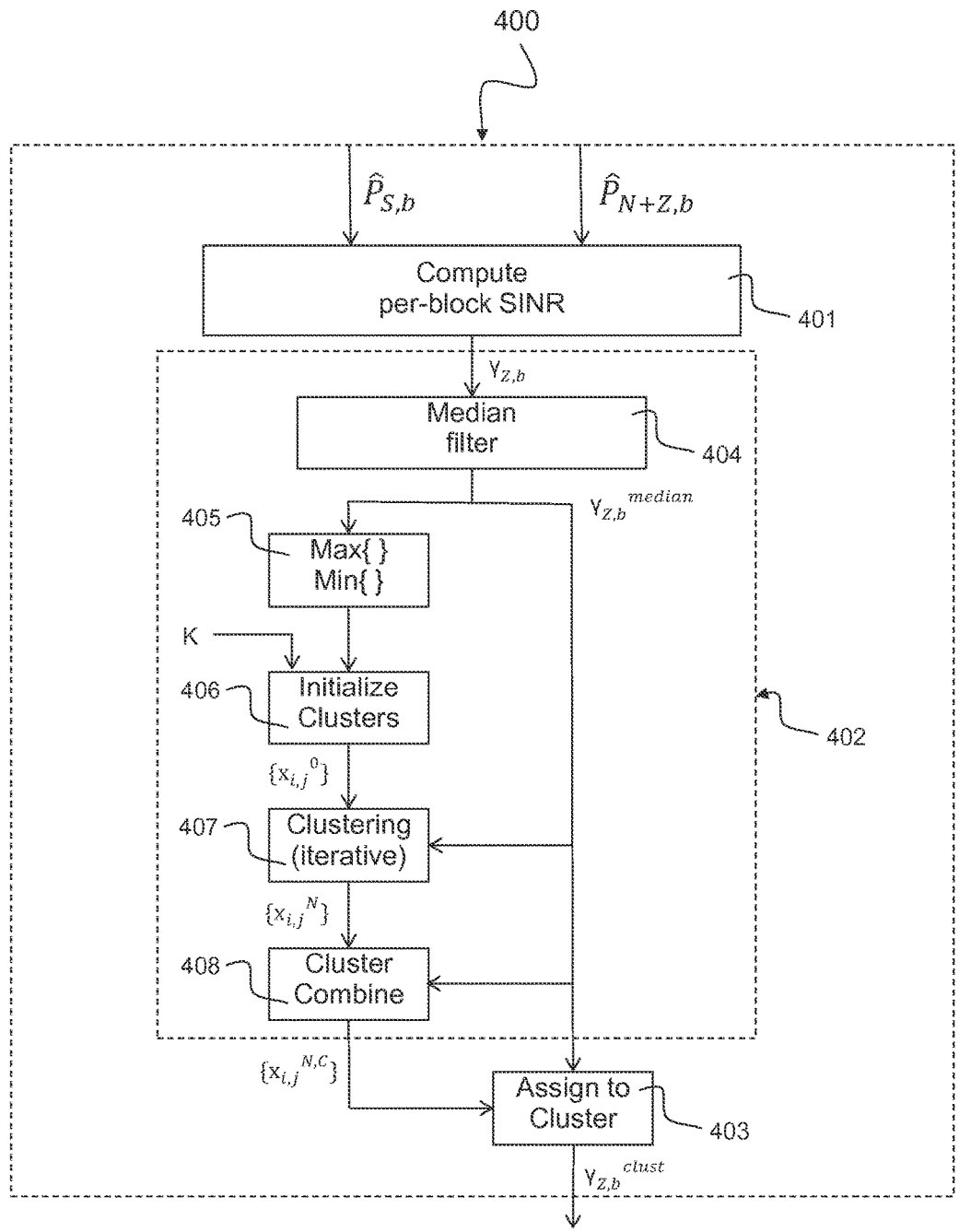
FIG. 4 is a block diagram illustrating a processing circuit 400 for processing resource blocks in a receiver.

FIG. 4 is a block diagram illustrating a processing circuit 400 for processing resource blocks in a receiver. The processing circuit may be used, inter alia, for implementing blind parameter estimation in dynamic inter-cell interference scenarios. FIG. 4 also describes a method for processing blocks in a receiver when the blocks described with reference to the processing circuit 400 are interpreted as blocks or steps of a method.

The processing circuit 400 may include a first block 401 for computing per-block SINRs, for example by generating coarse blind SINR estimates $\gamma_{Z,b}$ with PRB granularity. The SINRs may be generated based on power estimates of a desired signal $\hat{P}_{S,b}$ and power estimates of interference and noise $\hat{P}_{N+Z,b}$. The processing circuit 400 may include a second block 402 for performing cluster analysis techniques based on the SINR estimates $\gamma_{Z,b}$ received from the first block 401. The cluster analysis techniques may be used for refining the previous SINR estimates and providing clusters $\{x_{i,j}^{N,C}\}$. The processing circuit 400 may include a third block 403 for assigning the SINR estimates $\gamma_{Z,b}$ to clusters $\{x_{i,j}^{N,C}\}$ as determined by the cluster analysis of the second block 402 thereby providing clustered SINR estimates $\gamma_{Z,b}^{clust}$.

The second block 402 of the processing circuit 400 may include a filter, e.g. a median filter 404 for filtering the SINR estimates $\gamma_{Z,b}$ to provide (median)-filtered SINR estimates $\gamma_{Z,b}^{median}$. Other filtering techniques may as well be used, e.g. such as arithmetic mean filtering, harmonic mean filtering or geometric mean filtering. The second block 402 may further include a MaxMin block 405, a cluster initialization block 406, a clustering block 407 and a cluster combining block 408. The MaxMin block 405 may determine a maximum and a minimum of the (median)-filtered SINR estimates $\gamma_{Z,b}^{median}$ and provide them to the cluster initialization block 406 that may initialize a number of K clusters based on the maximum and the minimum received from the MaxMin block 405. The initial clusters $\{x_{i,j}^{0}\}$ provided by the cluster initialization block 406 may be refined in the clustering block 407 based on the (median)-filtered SINR estimates $\gamma_{Z,b}^{median}$. The clusters $\{x_{i,j}^{N}\}$ determined by the clustering block 407 may be provided to the cluster combining block 408 that may determine combination clusters $\{x_{i,j}^{N,C}\}$ based on the clusters $\{x_{i,j}^{N}\}$ and the (median)-filtered SINR estimates $\gamma_{Z,b}^{median}$. The combination clusters $\{x_{i,j}^{N,C}\}$ may be outputs of the second block 402 and may be provided to the third block 403 where the (median)-filtered SINR estimates $\gamma_{Z,b}^{median}$ may be assigned to the combination clusters $\{x_{i,j}^{N,C}\}$.

In one implementation of the processing circuit 400 the cluster combining block 408 may be omitted. In that implementation, the clusters $\{x_{i,j}^{N}\}$ as determined by the clustering block 407 may be outputs of the second block 402 and may be provided to the third block 403 where the (median)-filtered SINR estimates $\gamma_{Z,b}^{median}$ may be assigned to the clusters $\{x_{i,j}^N\}$.

In the following, one exemplary implementation of the first block 401 is described. The first block 401 may use the (few) reference symbols (RS) available in a single PRB, e.g. at least two of the pilot symbols P1, P2, P3, P4 described above with respect to FIG. 3. The noise plus interference power may be computed as follows:

With reference to FIG. 3, calculate:

$$\hat{H}_{av} = \frac{\sum_{i=1,2,3,4} y_i \cdot p_i^*}{4}, \quad (1)$$

where $p_i$ are the known reference symbols transmitted at pilot positions and $y_i$ are the corresponding received noisy samples.

Using equation (1) compute:

$$\hat{\sigma}_{Av}^2 = \frac{\sum_{i=1,2,3,4} |y_i - \hat{H}_{av} \cdot p_i|^2}{4} \quad (2)$$

A first coarse estimate for the block SINR measured at the given PRB with index b is then given by:

$$\gamma_{Z,b} = \frac{|\hat{H}_{av}|^2}{\hat{\sigma}_{Av}^2} \quad (3)$$

Obviously, approaches more sophisticated than equation (1) are possible, including differential methods or more complex 2D filtering. The one described above has, however, the lowest complexity and requires no a priori knowledge on the channel statistics.

The second block 402 may be based on clustering/classification methods as employed in the context of image processing which require minimal a priori knowledge on the statistics of the original set of data. The goal of these methods is to group a set of objects (in this case SINR estimates) in such a way that objects in the same group (called a cluster) are more similar to each other than to those in other groups (clusters). Typical inter-cell interference scenarios are characterized by few dominant interferers, and the superimposition of their powers generates a limited number of SINR regions (or aggregation areas) which can be regarded as clusters. Applying a clustering technique is an effective way to reduce the number of outliers in the original set of SINR estimates.

In the following, one exemplary implementation of the second block 402 is described. An exemplary realization of the second block 402 may be based on the k-mean clustering approach and adapted to the specific purposes and statistics of receiving interfered radio signals. Each block depicted in FIG. 4 may be performed separately per subframe and is described in the following.

The median filter 404 may be a non-linear one-dimensional filter that may be used for noise reduction when edges shall be preserved. The median filter 404 may be a non-linear digital filter for smoothing of signals, suppression of impulse noise and edge preservation. Because the median of a set is defined as the value that separates the upper half from the lower half of a dataset, in one exemplary implementation an uneven number may be used for the filter window size. The size of the window may be selected according to the number of RB in a Resource-Block-Group (RBG) which may be the lowest granularity for resource assignments. When the window has an odd number of entries, the median is simple to define: it is just the middle value after all the entries in the window have been sorted numerically.

In one implementation of the median filter 404 a window of size N=2M+1 may be sliced along the entire signal sequence and the center value of each window may be replaced by the median of the values in the window. For example, in 1-D filtering the window $W_i = \{x_{i-M} \ldots x_i \ldots x_{i+M}\}$ is centered on the i-th input value; the filter output is $y_i$=median($W_i$). In a d-D filtering (with d>1), a window of size 2M+1 for each dimension (d) is moved along the input data, the window $W_{i,j\ldots k}$ is centered on $x_{i,j\ldots k}$, and the output $y_{i,j\ldots k}$ is median of the values in $W_{i,j\ldots k}$. The median filter 404 may be implemented in real-time on the processing circuit 400 in hardware. The median filter 404 hardware circuit may belong to the class of non-recursive sorting network architectures that process the input samples sequentially in a word-based manner. The median filter 404 may maintain sorting of samples from the previous position of the sliding window, positioning only the incoming sample to the correct rank, thereby resulting in linear hardware complexity, minimal latency and a throughput of ½ of the sampling rate.

In one implementation the median filter 404 may be one of the following two groups: word-based and bit-based. Word-based (or bit-parallel) architectures process the bits of the input samples in parallel, but the samples are usually processed sequentially. On the contrary, bit-based filters process input samples in bit-serial but the samples included in the window are processed in parallel.

In one implementation the median filter 404 may be one of the following two categories: non-recursive and recursive. In the non-recursive filters, windows contain values of the input samples only, while in the recursive filters, the window contains the most recent median values as well as the input values. In one implementation the median filter 404 may be one of the following three categories: array architectures, sorting-network architectures and stack-based architectures. In array architectures each element of the window is associated with the rank, and with each window shift, the ranks are updated. Sorting network based architectures first range the samples and then select the sample of corresponding rank. Stack-based architectures translate filtering into binary domain through the use of threshold logic, majority elements, hamming comparators, etc.

The clustering block 407 may be based on a k-mean or on a k-median approach. In these algorithms the number of clusters K may be specified before the algorithm starts. In one example, a maximum of two non-colliding interferers may be assumed and the current number of possible interferers may be known. A cell search block not described in this disclosure may be used to provide information on the number of interfering cells. In the case of one non-colliding interferer there are two possible SINR states of the system, namely, 'interferer off' or 'interferer on'. This means, there are two clusters to which the current RB may be assigned. In the case of two non-colliding interferers, there are four possibilities and thus four clusters to which the current RB SINR may be assigned. The flow diagram of the clustering algorithm is detailed in FIG. 5. For the "cluster representative calculation" both the k-mean and k-median approach may be used.

The representatives $x_i$ of a cluster $i \in \{1, 2, \ldots, K\}$ may be initialized uniformly in the range of the minimum SINR$_{min}$ and maximum SINR$_{max}$ value of the estimates in one sub-frame as determined by the MaxMin block 405. The representative of cluster i may be calculated for example by the cluster initialization block 406 as:

$$x_i = SINR_{min} + (i-1)\frac{SINR_{max} - SINR_{min}}{K-1}. \quad (4)$$

The result of the algorithm greatly depends on the initialization. Simulations have shown that the initialization described by equation (4) is robust for the assumed systems setup.

The cluster combination block 408 may apply the following two further refinements: small clusters combination and almost overlapping clusters combination.

As for the first refinement, clusters may be combined when the number of data-points in a cluster is below a predefined value, which on its turn may depend on the overall available resources. This condition can be formulated as $|S_i| < nRB_{min}$. In one example, $nRB_{min}$ may be selected in the range of 5% to 10% of the total amount of RBs. If a cluster fulfills this condition it may be combined with the cluster corresponding to the next higher SINR or with the one representing the second highest SINR if the current cluster is already assigned to the highest SINR.

As for the second refinement two clusters, e.g. denoted by their indices i and j may be merged if the following relation holds:

$$|10lg(x_i) - 10lg(x_j)| < minDistance,$$

i.e., if the absolute difference between the representatives of cluster i and cluster j is below a defined value, which in turn may depend on the noise of the SINR estimate and the required SINR granularity for the channel estimation filter configuration. An exemplary value for minDistance may be in the range 1-2 dB if an SINR granularity of 5 dB is chosen.

After the cluster combination block 408, the output of the median filter 404 may be associated with and then replaced by the representative of the corresponding cluster. This may be carried out with block (or PRB) granularity. The new outputs $\gamma_{Z,b}^{clust}$ provide an accurate 2D SINR map that may be passed to the other receiver blocks, e.g. channel estimation (CE), whitening filter (WF) and channel state information feedback (CSIFB) for interference mitigation purposes.

In an exemplary implementation the processing circuit 400 may include a first unit 401 configured to receive a signal comprising transmissions from a plurality of radio cells, wherein received samples of the signal are arranged in a plurality of resource blocks; a second unit 402 configured to form a plurality of clusters $\{x_{i,j}^N\}$ based on a similarity criterion with respect to the plurality of resource blocks; and a third unit 403 configured to assign each resource block of the plurality of resource blocks to one cluster of the plurality of clusters $\{x_{i,j}^N\}$. The first unit 401 may be configured to provide for each resource block a signal-to-interference and noise ratio $\gamma_{Z,b}$ estimated over the respective resource block. The second unit 402 may include a median filter 404 configured to filter the signal-to-interference and noise ratios $\gamma_{Z,b}$ and to provide median-filtered signal-to-interference and noise ratios $\gamma_{Z,b}^{median}$. The second unit 402 may include a clustering unit 407 configured to provide the plurality of clusters $\{x_{i,j}^N\}$ based on a classification algorithm.

Figure 5:
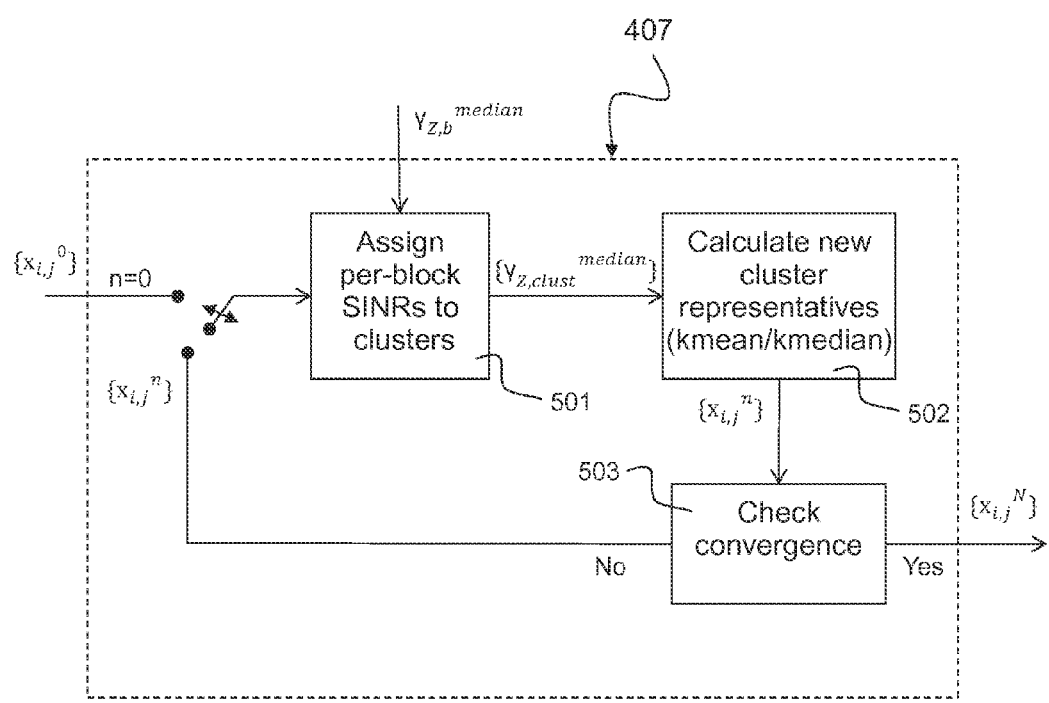
FIG. 5 is a schematic diagram illustrating a clustering block 407 in a processing circuit 400 as depicted in FIG. 4.

FIG. 5 is a schematic diagram illustrating a clustering block 407 in a processing circuit 400 as depicted in FIG. 4.

The clustering block 407 may include an SINR-to-cluster assigning block 501, a new cluster $\{x_{i,j}^0\}$ representative calculation block 502 and a convergence checking block 503. The clustering block 407 may receive the initial clusters WA provided by the cluster initialization block 406 and perform iteration loops n for providing the clusters $\{x_{i,j}^N\}$ to the cluster combining block 408 as depicted in FIG. 4.

In the SINR-to-cluster assigning block 501, SINRs $\gamma_{Z,b}^{median}$ may be assigned to clusters $\{x_{i,j}^n\}$. In one implementation the following cluster assignment policy may be used. $S_i$ may denote all the points assigned to cluster i. The data-point $x_p$ may be assigned to $S_i$ if the condition:

$$|x_p - x_i| \le |x_p - x_j| \forall j \ne i \quad (5)$$

is fulfilled. The cluster assigned SINRs $\gamma_{Z,clust}^{median}$ may be provided to the new cluster representative calculation block 502.

In the new cluster representative calculation block 502 the new representative of cluster i may be calculated from the elements of the set $S_i$ using the k-mean or the k-median approach. The difference between the k-mean and k-median algorithm is that the k-mean calculates the arithmetic mean of all the elements in $S_i$ while the k-median algorithm calculates the median. A median filter 404 as described above with respect to FIG. 4 may be used to calculate the median. The median may weight outliers less and may therefore be preferred when operating on a noisy dataset which may also be biased. In implementations, where the computational complexity of calculating the median may be too high, the geometric or the harmonic mean may be used. Both the geometric and arithmetic mean can reduce the number of outliers, although not as effectively as the median.

In the convergence checking block 503, convergence of the algorithm may be checked. A measure for convergence of the algorithm may be that the relative difference between the new and the old representative is below a predefined threshold for each cluster. The convergence checking block 503 may receive the new representatives of the clusters $\{x_{i,j}^n\}$ from the new cluster representative calculation block 502 and may provide the clusters $\{x_{i,j}^N\}$ to the cluster combining block 408 when convergence is detected (Yes) or otherwise (No) provide the clusters $\{x_{i,j}^n\}$ of iteration "n" with the new representatives to the SINR-to-cluster assigning block 501 for a new iteration.

Figure 6:
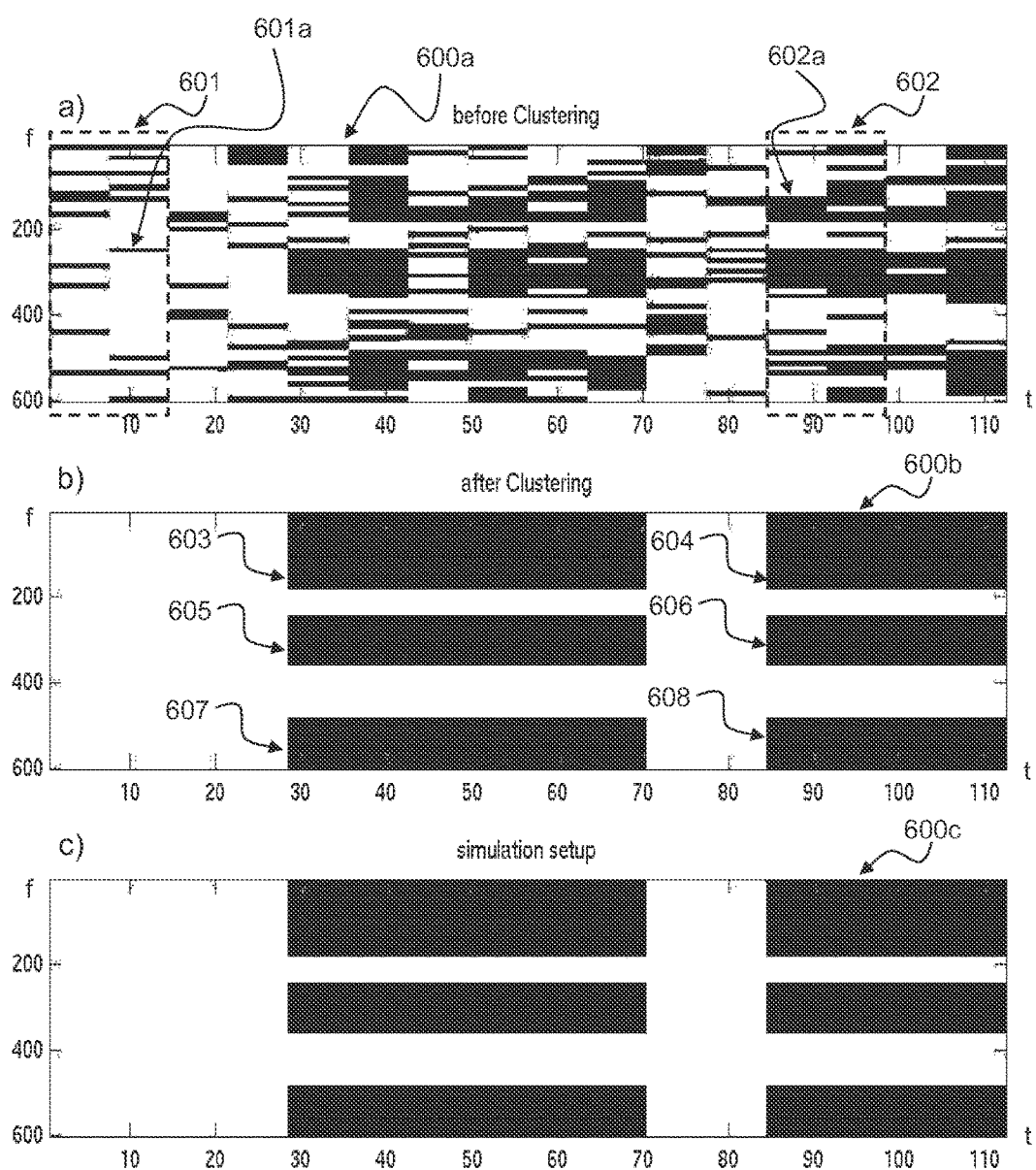
FIGS. 6 a), b), c) are schematic diagrams illustrating SINR maps before clustering 600a, after clustering 600b and according to a simulation 600c.

FIGS. 6 a), b), c) are schematic diagrams illustrating SINR maps before clustering 600a, after clustering 600b and according to a simulation 600c. The first SINR map 600a before clustering depicts a map over time t and frequency f including multiple subframes 601, 602 where each of the subframes 601, 602 may include multiple resource blocks 601a, 602a. The subframes 601, 602 depicted in FIG. 6a) include an exemplary number of fifty resource blocks 601a, 602a in frequency direction and an exemplary number of two resource blocks 601a, 602a in time direction, where each resource block 601a, 602a may include an exemplary number of twelve resource elements or OFDM symbols in frequency direction and an exemplary number of seven resource elements or OFDM symbols in time direction, e.g. according to the illustration of FIG. 3. Of course, other numbers may be used as well.

In one example, a subframe may be defined according to LTE Advanced having two slots each of duration 0.5 ms. Ten subframes of 1 ms duration may constitute a radio frame of 10 ms duration. In frequency direction, one of the bandwidths 1.4, 3, 5, 10 and 20 MHz may be implemented according to LTE Advanced. The resource block 601a, 602a may be implemented as physical resource block according to LTE Advanced having 12 subcarriers times 7 OFDM symbols, e.g. according to the illustration of FIG. 3. The scaling of the time and frequency axes of FIGS. 6 a), b) and c) is only for illustrative purposes and may not have to be true to scale.

The second SINR map 600b shows the result after clustering. Six clusters 603, 604, 605, 606, 607, 608 were identified by using the clustering techniques as described above with respect to FIGS. 3 to 5. A resource block 601a of a sparse subframe 601 is not assigned to a cluster while a resource block 602a of a dense subframe 602 is assigned to a cluster 604. FIG. 6b) shows the effect of clustering on the initial SINR estimates in a time- and frequency-selective interference scenario. All values may be quantized with a step size of 5 dB, for example. It is seen that the clustering step significantly reduces the number of outliers in the original set of estimates.

A comparison of the second SINR map 600b with the simulation SINR map 600c that represents the desired cluster map shows that no deviation from the desired map can be detected.

Figure 7:
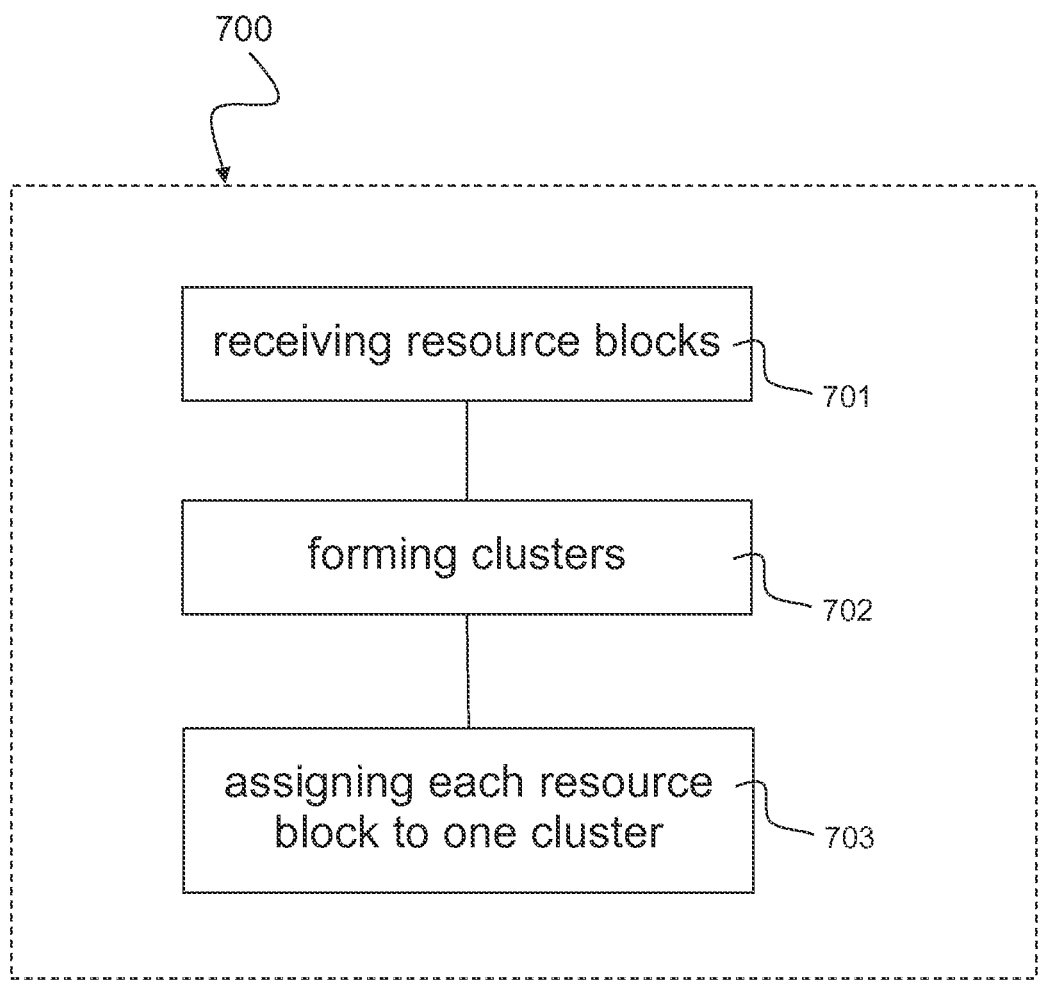
FIG. 7 is a schematic diagram illustrating a method 700 for processing resource blocks in a receiver.

FIG. 7 is a schematic diagram illustrating a method 700 for processing resource blocks in a receiver. The method 700 may include receiving 701 a signal comprising transmissions from a plurality of radio cells, wherein received samples of the signal are arranged in a plurality of resource blocks 300, e.g. as described above with respect to FIGS. 3 and 6. The method 700 may include forming 702 a plurality of clusters $\{x_{i,j}^N\}$ based on a similarity criterion with respect to the plurality of resource blocks 300, e.g. as described above with respect to FIGS. 3 to 6. The method 700 may include assigning 703 each resource block of the plurality of resource blocks 300 to one cluster of the plurality of clusters $\{x_{i,j}^N\}$, e.g. as described above with respect to FIGS. 3 to 6.

In one implementation, the method 700 comprises assigning to each resource block 300 a signal-to-interference and noise ratio $\gamma_{Z,b}$ estimated over the respective resource block 300, e.g. as described above with respect to FIG. 4. In one implementation of the method 700 the similarity criterion may be based on a difference between respective signal-to-interference and noise ratios $\gamma_{Z,b}$. In one implementation of the method 700 estimating the signal-to-interference and noise ratio $\gamma_{Z,b}$ over a resource block 300 may be based on received samples arranged at known pilot positions P1, P2, P3, P4 in the resource block 300, e.g. as described above with respect to FIG. 3. In one implementation, the method 700 comprises generating a two-dimensional map, e.g. according to the second map 600b described above with respect to FIG. 6b), based on the plurality of clusters, the map 600b reflecting a distribution of the signal-to-interference and noise ratio $\gamma_{Z,b}$ of the received signal across time and frequency. In one implementation, the method 700 comprises using the two-dimensional map 600b in the receiver for interference mitigation. In one implementation, the method 700 comprises filtering the signal-to-interference and noise ratios $\gamma_{Z,b}$ by using a median filter, e.g. as described above with respect to FIG. 4 and applying the similarity criterion to the median-filtered signal-to-interference and noise ratios $\gamma_{Z,b}^{median}$.

In one implementation of the method 700 the plurality of resource blocks 300 forms a time-frequency grid each resource block 300 having a same predetermined dimension within the grid, e.g. as illustrated above with respect to FIG. 3. In one implementation of the method 700 a predetermined number of the resource blocks 300 forms a subframe, e.g. as described above with respect to FIGS. 3 and 6 wherein forming the clusters is performed on a subframe basis and assigning the resource blocks 300 to clusters $\{x_{i,j}^N\}$ is performed on a resource block basis. In one implementation, the method 700 comprises using a classification algorithm for forming the plurality of clusters $\{x_{i,j}^N\}$, wherein the classification algorithm is based on one of a k-mean and a k-median approach as described above with respect to FIGS. 3 to 6. In one implementation, the method 700 comprises initializing a number of the clusters $\{x_{i,j}^0\}$ based on a known or estimated number of interfering radio cells before forming the plurality of clusters $\{x_{i,j}^N\}$ as described above with respect to FIGS. 3 to 6. In one implementation, the method 700 comprises combining clusters of the plurality of clusters $\{x_{i,j}^N\}$ based on at least one of the following refinement constructs: small clusters combination, and almost overlapping clusters combination as described above with respect to FIGS. 4 and 5.

Figure 8:
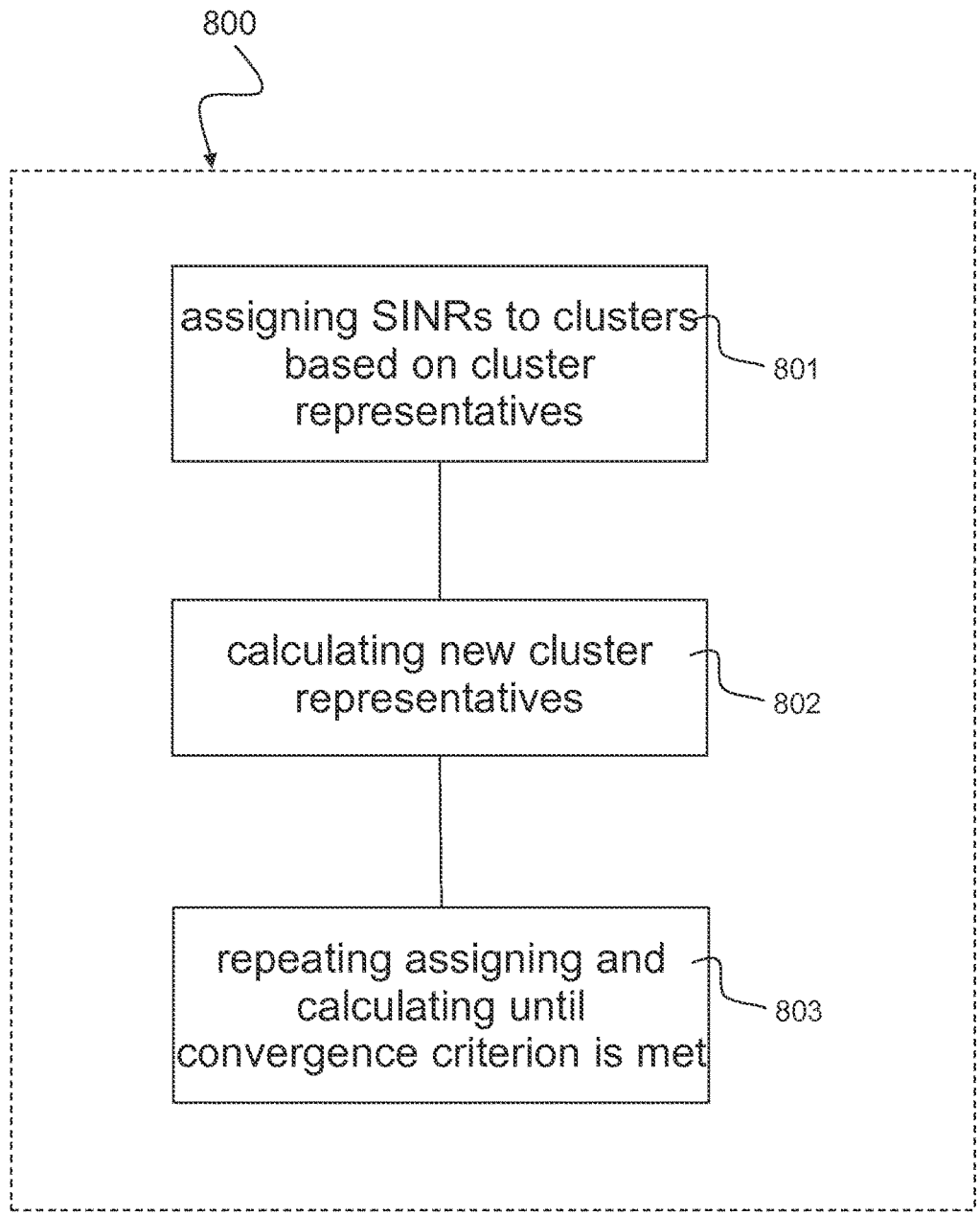
FIG. 8 is a schematic diagram illustrating a method 800 for clustering a plurality of resource blocks.

FIG. 8 is a schematic diagram illustrating a method 800 for clustering a plurality of resource blocks. The method 800 may include assigning 801 a plurality of signal-to-interference and noise ratios each one estimated over a respective one of the plurality of resource blocks to a plurality of clusters based on a distance criterion with respect to representatives of the clusters, e.g. according to the block 501 described above with respect to FIG. 5. The method 800 may include calculating 802 new representatives of the clusters, wherein a new representative of a cluster is calculated based on averaging the signal-to-interference and noise ratios assigned to the cluster, e.g. according to the block 502 described above with respect to FIG. 5. The method 800 may include repeating 803 the assigning and the calculating until a convergence criterion is met, e.g. according to the block 503 described above with respect to FIG. 5.

In one implementation of the method 800 the convergence criterion may be met when a relative difference between the new representatives and the representatives of the clusters crosses a predetermined threshold. In one implementation of the method 800 calculating the new representatives may be based on one of a k-mean and a k-median algorithm. In one implementation the method 800 may include initializing the representatives of the clusters within a range between a minimum and a maximum of the signal-to-interference and noise ratios $\gamma_{Z,b}$ before starting the assigning and the calculating. In one implementation of the method 800 the representatives of the clusters may be uniformly initialized within the range between the minimum and the maximum of the signal-to-interference and noise ratios. In one implementation, the method 800 may include after the convergence criterion is met: combining a cluster with another cluster of the plurality of clusters when a number of data points in the cluster is below a predetermined value. In one implementation the method 800 may include after the convergence criterion is met: combining two clusters of the plurality of clusters when an absolute difference between representatives of the two clusters is below a predetermined value.

Figure 9:
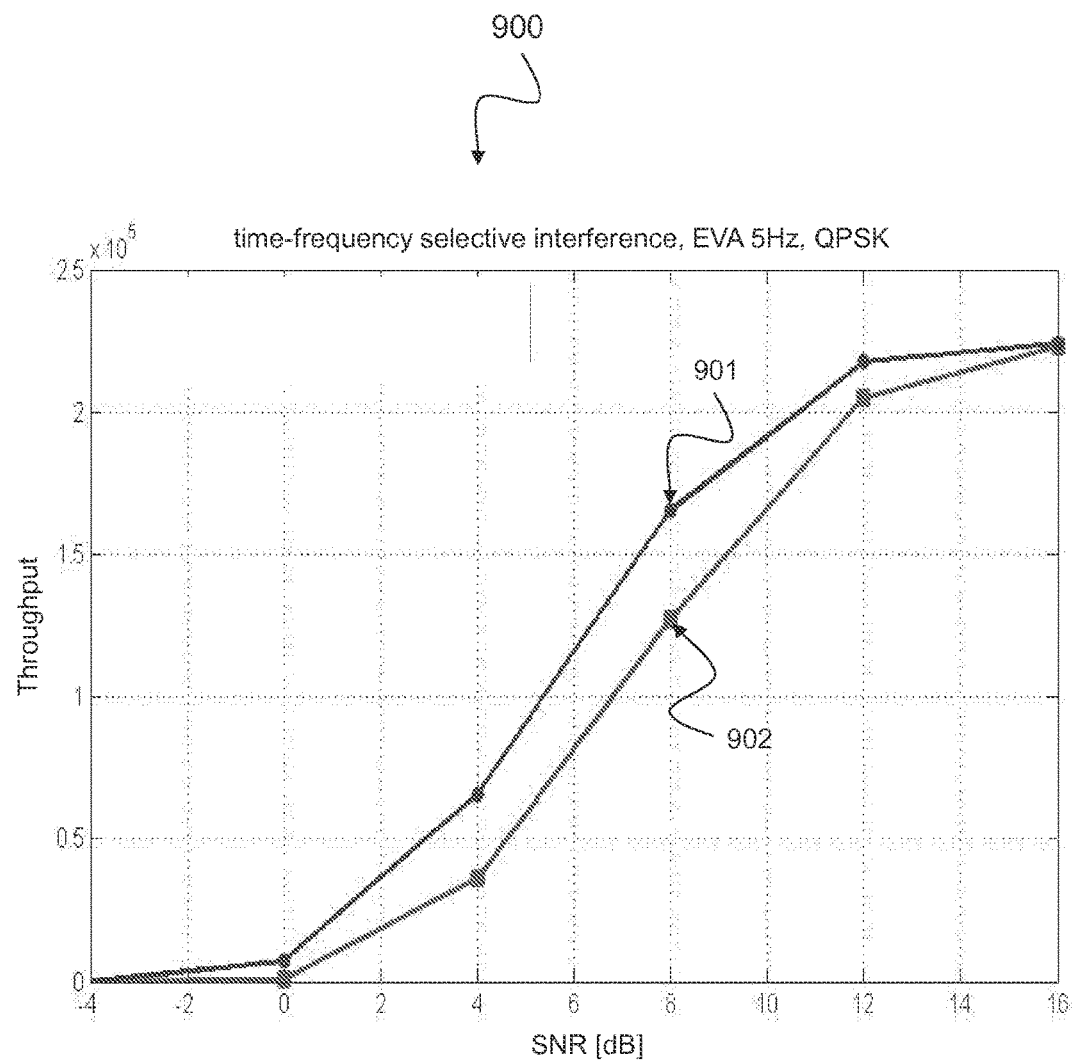
FIG. 9 is a performance diagram 900 illustrating throughput of time-frequency selective interference with channel model EVA 5 Hz, QPSK when a method 700 for processing resource blocks is applied.

FIG. 9 is a performance diagram 900 illustrating throughput of time-frequency selective interference with channel model EVA 5 Hz, QPSK when a method 700 for processing resource blocks is applied. A 2×2 MIMO configuration is used.

A blindly generated SINR map, e.g. as depicted in FIG. 6b) is used to configure the channel estimation (CE) filters in a time- and frequency-selective interference environment. A channel estimation using a blindly generated SINR map 600b may provide a throughput 901 that is about 2 dB greater than a throughput 902 of a baseline solution which ignores the selective nature of the interference and hence adapts the CE filter too slowly. The baseline SINR estimator according to the throughput curve 902 is in fact based on an explicit channel estimate and its complexity is too large to generate a new estimate at each sub-frame.

Figure 10:
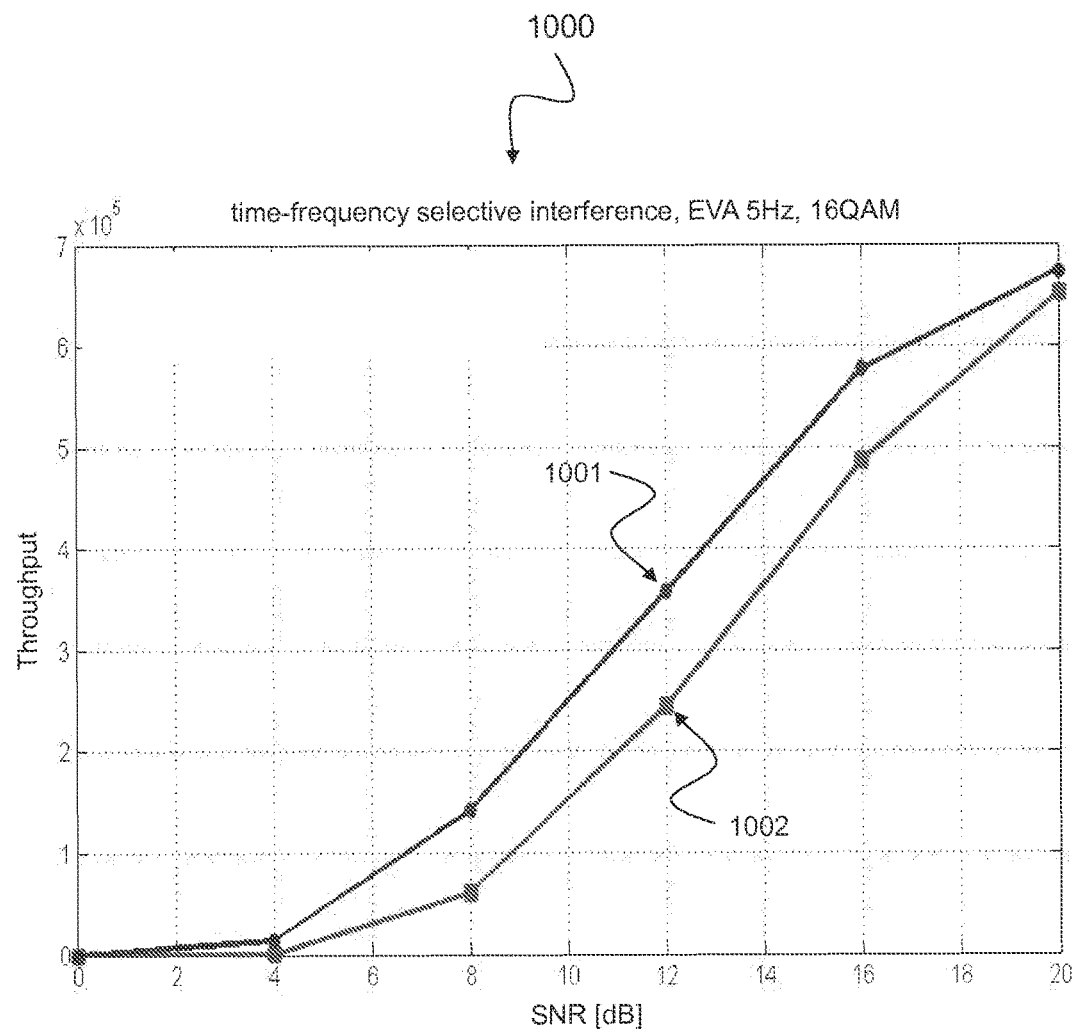
FIG. 10 is a performance diagram 1000 illustrating throughput of time-frequency selective interference with channel model EVA 5 Hz, 16QAM when a method 700 for processing resource blocks is applied.

FIG. 10 is a performance diagram 1000 illustrating throughput of time-frequency selective interference with channel model EVA 5 Hz, 16QAM when a method 700 for processing resource blocks is applied.

The same results as in FIG. 9 can be observed. A channel estimation using a blindly generated SINR map 600b may provide a throughput 1001 that is about 2 dB greater than a throughput 1002 of a baseline solution which ignores the selective nature of the interference and hence adapts the CE filter too slowly.

A method 700 for processing resource blocks shows improved performance in the presence of few clusters which is typically the case in both homogenous and heterogeneous networks as described above with respect to FIG. 1. When changing the interference configuration and its frequency selectivity, i.e. PRB allocation of interferers at each sub-frame, while maintaining the same relative power levels, a method 700, 800 or a processing circuit 400 will show no significant performance degradation. The methods 700, 800 and the processing circuit 400 show improved UE robustness against co-channel interference in LTE and other OFDM-based cellular networks resulting in higher network capacity and more stable user experience.

The methods and devices as described in this disclosure may be used in the LTE physical layer together with interference mitigation methods as e.g. CRS cancellation, whitening methods, CSI feedback. The information provided may be used by subsequent algorithms to improve the receiver performance, i.e. increased data throughput, optimized feedback, improved measurement accuracy, etc. The methods and devices as described in this disclosure may be used in any unit that may require information about distribution of interferers. The methods and devices as described in this disclosure may be used both in the downlink, i.e. from a base station to a mobile station such as the UE and in the uplink, i.e. from a mobile station to the base station. The methods and devices as described in this disclosure may be used in network assisted interference cancellation and suppression (NAICS), e.g. according to 3GPP TR 36.866, for improving interference cancellation.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 400, 700, 800 as described above with respect to FIGS. 4, 5, 7 and 8. Such a computer program product may include a readable storage medium storing program code thereon for use by a processor, the program code comprising instructions for performing any of the methods 400, 700, 800 as described above.

EXAMPLES

The following examples pertain to further embodiments. Example 1 is a method for processing resource blocks in a receiver, the method comprising: receiving a signal comprising transmissions from a plurality of radio cells, wherein received samples of the signal are arranged in a plurality of resource blocks; forming a plurality of clusters based on a similarity criterion with respect to the plurality of resource blocks; and assigning each resource block of the plurality of resource blocks to a cluster of the plurality of clusters.

In Example 2, the subject matter of Example 1 can optionally include assigning to each resource block a signal-to-interference and noise ratio estimated over a respective resource block.

In Example 3, the subject matter of Example 2 can optionally include that the similarity criterion is based on a difference between respective signal-to-interference and noise ratios.

In Example 4, the subject matter of any one of Examples 2-3 can optionally include that estimating the signal-to-interference and noise ratio over a resource block is based on received samples arranged at known pilot positions in the resource block.

In Example 5, the subject matter of any one of Examples 2-4 can optionally include generating a two-dimensional map based on the plurality of clusters, the map representing a distribution of the signal-to-interference and noise ratio of the received signal across time and frequency.

In Example 6, the subject matter of Example 5 can optionally include using the two-dimensional map in the receiver for interference mitigation.

In Example 7, the subject matter of any one of Examples 2-8 can optionally include filtering the signal-to-interference and noise ratios by using a median filter; and applying the similarity criterion to the median-filtered signal-to-interference and noise ratios.

In Example 8, the subject matter of any one of Examples 1-7 can optionally include that the plurality of resource blocks forms a time-frequency grid each resource block having a same predetermined dimension within the grid.

In Example 9, the subject matter of any one of Examples 1-8 can optionally include that a predetermined number of the plurality of resource blocks forms a subframe; that forming the plurality of clusters is performed on a subframe basis; and that assigning the plurality of resource blocks to the plurality of clusters is performed on a resource block basis.

In Example 10, the subject matter of any one of Examples 1-9 can optionally include using a classification algorithm for forming the plurality of clusters, wherein the classification algorithm is based on one of a k-mean and a k-median approach.

In Example 11, the subject matter of any one of Examples 1-10 can optionally include initializing a number of the clusters based on a known or estimated number of interfering radio cells before forming the plurality of clusters.

In Example 12, the subject matter of any one of Examples 1-11 can optionally include combining clusters of the plurality of clusters based on at least one of the following refinement constructs: small clusters combination, and substantially overlapping clusters combination.

Example 13 is a processing circuit for processing resource blocks in a receiver, the processing circuit comprising: a first unit configured to receive a signal comprising transmissions from a plurality of radio cells, wherein received samples of the signal are arranged in a plurality of resource blocks; a second unit configured to form a plurality of clusters based on a similarity criterion with respect to the plurality of resource blocks; and a third unit configured to assign each resource block of the plurality of resource blocks to a cluster of the plurality of clusters.

In Example 14, the subject matter of Example 13 can optionally include that the first unit is configured to provide for each resource block a signal-to-interference and noise ratio estimated over the respective resource block.

In Example 15, the subject matter of Example 14 can optionally include that the second unit comprises a median filter configured to filter the signal-to-interference and noise ratios and to provide median-filtered signal-to-interference and noise ratios.

In Example 16, the subject matter of Example 15 can optionally include that the second unit comprises a clustering unit configured to provide the plurality of clusters based on a classification algorithm.

Example 17 is a method for clustering a plurality of resource blocks, the method comprising: assigning a plurality of signal-to-interference and noise ratios each one estimated over a respective one of the plurality of resource blocks to a plurality of clusters based on a distance criterion with respect to representatives of the clusters; calculating new representatives of the clusters, wherein a new representative of a cluster is calculated based on averaging the signal-to-interference and noise ratios assigned to the cluster; and repeating the assigning and the calculating until a convergence criterion is met.

In Example 18, the subject matter of Example 17 can optionally include that the convergence criterion is met when a relative difference between the new representatives and the representatives of the clusters crosses a predetermined threshold.

In Example 19, the subject matter of any one of Examples 17-18 can optionally include that calculating the new representatives is based on one of a k-mean and a k-median algorithm.

In Example 20, the subject matter of any one of Examples 17-19 can optionally include initializing the representatives of the clusters within a range between a minimum and a maximum of the signal-to-interference and noise ratios before starting the assigning and the calculating.

In Example 21, the subject matter of Example 20 can optionally include that the representatives of the clusters are uniformly initialized within the range between the minimum and the maximum of the signal-to-interference and noise ratios.

In Example 22, the subject matter of any one of Examples 17-21 can optionally include after the convergence criterion is met: combining a cluster with another cluster of the plurality of clusters when a number of data points in the cluster is below a predetermined value.

In Example 23, the subject matter of any one of Examples 17-22 can optionally include after the convergence criterion is met: combining at least two clusters of the plurality of clusters when an absolute difference between representatives of the two clusters is below a predetermined value.

Example 24 is a computer readable medium on which computer instructions are stored which when executed by a computer, cause the computer to perform the method of any one of Examples 1 to 12 and 17 to 23.

Example 25 is a transmission system, comprising a radio receiver comprising a processing circuit according to any one of Examples 13 to 16; and at least one transmitter configured to transmit a radio signal via a plurality of antenna ports.

In Example 26, the subject matter of Example 25 can optionally include that the radio receiver comprises a plurality of receive antennas configured to receive the signal comprising transmissions from the plurality of radio cells.

Example 27 is a transmission system, comprising a radio receiver comprising a processing circuit according to any one of Examples 13 to 16; and a plurality of radio cells, each radio cell being configured to transmit a radio signal.

In Example 28, the subject matter of Example 27 can optionally include that each radio cell comprises a plurality of transmit antennas configured to transmit the radio signal of each radio cell; and that the radio receiver comprises a plurality of receive antennas configured to receive the signal comprising transmissions from the plurality of radio cells.

Example 29 is a processing circuit for processing resource blocks in a receiver, the processing circuit comprising: receiving means for receiving a signal comprising transmissions from a plurality of radio cells, wherein received samples of the signal are arranged in a plurality of resource blocks; clustering means for forming a plurality of clusters based on a similarity criterion with respect to the plurality of resource blocks; and assigning means for assigning each resource block of the plurality of resource blocks to one cluster of the plurality of clusters.

In Example 30, the subject matter of Example 29 can optionally include that the receiving means is configured to provide for each resource block a signal-to-interference and noise ratio estimated over the respective resource block.

In Example 31, the subject matter of Example 30 can optionally include that the clustering means comprises filtering means for filtering the signal-to-interference and noise ratios and for providing filtered signal-to-interference and noise ratios.

In Example 32, the subject matter of Example 31 can optionally include that the clustering means comprises a clustering unit configured to provide the plurality of clusters based on a classification algorithm.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A method for processing resource blocks in a receiver of a user equipment, the method comprising:
   receiving, by the receiver of the user equipment, a signal comprising transmissions from a plurality of radio cells, wherein received samples of the signal are arranged in a plurality of resource blocks;

forming a plurality of clusters based on a similarity criterion with respect to the plurality of resource blocks;

assigning each resource block of the plurality of resource blocks to a cluster of the plurality of clusters;

assigning to each resource block a signal-to-interference and noise ratio estimated over a respective resource block;

filtering the signal-to-interference and noise ratios by using a median filter; and applying the similarity criterion to the median-filtered signal-to-interference and noise ratios.

2. The method of claim 1, wherein the similarity criterion is based on a difference between respective signal-to-interference and noise ratios.

3. The method of claim 1,
wherein estimating the signal-to-interference and noise ratio over a resource block is based on received samples arranged at known pilot positions in the resource block.

4. The method of claim 1, comprising:
generating a two-dimensional map based on the plurality of clusters, the map representing a distribution of the signal-to-interference and noise ratio of the received signal across time and frequency.

5. The method of claim 4, comprising:
using the two-dimensional map in the receiver for interference mitigation.

6. The method of claim 1,
wherein the plurality of resource blocks forms a time-frequency grid each resource block having a same predetermined dimension within the grid.

7. The method of claim 1,
wherein a predetermined number of the plurality of resource blocks forms a subframe;
wherein forming the plurality of clusters is performed on a subframe basis; and
wherein assigning the plurality of resource blocks to the plurality of clusters is performed on a resource block basis.

8. The method of claim 1, comprising:
using a classification algorithm for forming the plurality of clusters, wherein the classification algorithm is based on one of a k-mean and a k-median approach.

9. The method of claim 1, comprising:
initializing a number of the clusters based on a known or an estimated number of interfering radio cells before forming the plurality of clusters.

10. The method of claim 1, comprising:
combining clusters of the plurality of clusters based on at least one of the following refinement constructs:
small clusters combination, and
substantially overlapping clusters combination.

11. A processor of a user equipment for processing resource blocks, the processor comprising:
a receiver configured to receive a signal comprising transmissions from a plurality of radio cells, wherein received samples of the signal are arranged in a plurality of resource blocks, the receiver further configured to provide, for each resource block, a signal-to-interference and noise ratio estimated over the respective resource block;

a cluster analyzer configured to form a plurality of clusters based on a similarity criterion with respect to the plurality of resource blocks, the cluster analyzer comprising a median filter configured to filter the signal-to-interference and noise ratios and to provide median-filtered signal-to-interference and noise ratios; and a cluster assigner configured to assign each resource block of the plurality of resource blocks to a cluster of the plurality of clusters.

12. The processor of claim 11,
wherein the cluster analyzer comprises a cluster provider configured to provide the plurality of clusters based on a classification algorithm.

13. A method for clustering a plurality of resource blocks, the method comprising:
assigning a plurality of signal-to-interference and noise ratios each one estimated over a respective one of the plurality of resource blocks to a plurality of clusters based on a distance criterion with respect to representatives of the clusters;

calculating new representatives of the clusters, wherein a new representative of a cluster is calculated based on averaging the signal-to-interference and noise ratios assigned to the cluster; and repeating the assigning and the calculating until a convergence criterion is met.

14. The method of claim 13, wherein the convergence criterion is met when a relative difference between the new representatives and the representatives of the clusters crosses a predetermined threshold.

15. The method of claim 13,
wherein calculating the new representatives is based on one of a k-mean and a k-median algorithm.

16. The method of claim 13, comprising:
initializing the representatives of the clusters within a range between a minimum and a maximum of the signal-to-interference and noise ratios before starting the assigning and the calculating.

17. The method of claim 16, wherein the representatives of the clusters are uniformly initialized within the range between the minimum and the maximum of the signal-to-interference and noise ratios.

18. The method of claim 13, further comprising after the convergence criterion is met:
combining a cluster with another cluster of the plurality of clusters when a number of data points in the cluster is below a predetermined value.

19. The method of claim 13, further comprising after the convergence criterion is met:
combining at least two clusters of the plurality of clusters when an absolute difference between representatives of the two clusters is below a predetermined value.

* * * * *